(12) United States Patent
Kim

(10) Patent No.: US 7,035,992 B2
(45) Date of Patent: Apr. 25, 2006

(54) HIGH-SPEED TRANSLATION LOOKASIDE BUFFER

(75) Inventor: Min-Su Kim, Kyungki-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 403 days.

(21) Appl. No.: 10/426,686

(22) Filed: May 1, 2003

(65) Prior Publication Data

US 2004/0078545 A1  Apr. 22, 2004

(30) Foreign Application Priority Data

Oct. 22, 2002  (KR) .................. 10-2002-0064634

(51) Int. Cl.
*G06F 12/10* (2006.01)

(52) U.S. Cl. ................... 711/203; 200/207

(58) Field of Classification Search ................ 711/100, 711/154, 200, 203, 205, 206, 207; 365/230.03, 365/230.04

See application file for complete search history.

(56) References Cited

U.S. PATENT DOCUMENTS

| | | | | |
|---|---|---|---|---|
| 3,947,823 A | * | 3/1976 | Padegs et al. | .............. 711/202 |
| 4,096,573 A | * | 6/1978 | Heller et al. | ................. 711/207 |
| 4,136,385 A | * | 1/1979 | Gannon et al. | ............. 711/207 |
| 5,953,748 A | * | 9/1999 | Riordan | ...................... 711/207 |
| 6,216,200 B1 | * | 4/2001 | Yeager | ....................... 711/100 |
| 6,266,755 B1 | * | 7/2001 | Yeager | ....................... 711/210 |
| 2002/0057619 A1 | * | 5/2002 | Noda et al. | ................. 365/227 |
| 2004/0054867 A1 | * | 3/2004 | Stravers et al. | ............. 711/207 |

* cited by examiner

*Primary Examiner*—Tuan V. Thai
(74) *Attorney, Agent, or Firm*—Harness, Dickey & Pierce, P.L.C.

(57) ABSTRACT

A translation lookaside buffer, which includes a plurality of virtual address comparing circuits, a plurality of word line drivers, and a plurality of storing circuits. The plurality of virtual address comparing circuits receive a virtual address, compare the virtual address with each of virtual address tags, and output a control signal in response to the compared result. The plurality of word line drivers receive the control signal output from the plurality of virtual address comparing circuits to activate a word line corresponding to the control signal. The plurality of storing circuits include first and second memory cells connected to the word line and output physical addresses stored in the first and second memory cells in response to the activation of the word line. Each of the plurality of storing circuits has a buffer between a node to which the first memory cells and the word line are connected and a node to which the second memory cells and the word line are connected. Accordingly, the speed of a translation lookaside buffer can operate at higher speed.

22 Claims, 5 Drawing Sheets

HIGH-SPEED TRANSLATION LOOKASIDE BUFFER

BACKGROUND OF THE INVENTION

This U.S. nonprovisional application claims priority on Korean Patent Application No. 2002-64634, filed Oct. 22, 2002, in the Korean Intellectual Property Office, the contents of which are incorporated herein in their entirety by reference.

1. Field of the Invention

The present invention relates to a memory management system, and more particularly, to a translation lookaside buffer of a memory management system.

2. Description of the Related Art

Conventionally, one central processing unit (CPU) may execute a single program. However, recently, one CPU may execute a plurality of programs. For example, a user can manage schedules listening to an MP3 in a mobile environment. Also, the user can watch moving pictures downloading various content.

Programs that mobile environments execute have become increasingly complicated, larger, and process more data. As a result, resource limits are easily reached, and thus the program may cease to execute.

A memory management unit (MMU), which may be implemented by realizing a virtual memory system, assigns resources to a plurality of programs when the plurality of programs are executed in a CPU so that the plurality of programs run undisturbed. The MMU also recalls unnecessary resources so that resources are efficiently used.

The MMU may include a translation lookaside buffer (TLB) and a controller for controlling the operation of the TLB. The TLB translates a generated virtual address into a physical address.

FIG. 1 is a schematic view of a conventional TLB, which translates a virtual address into a physical address. The virtual address is divided into a virtual page number and a page offset. The TLB translates the virtual page number into a physical page number. All programs can be written so as to execute in a virtual memory space regardless of resources.

FIG. 2 is a block diagram of a general TLB 200. The TLB 200 shown in FIG. 2 includes a virtual address comparing circuit 210, a word line driver 220, and a storing circuit 230. The virtual address comparing circuit 210 compares a virtual address and virtual address tags (not shown) and outputs the compared result. The word line driver 220 activates word lines in response to a signal output from the virtual address comparing circuit 210. The storing circuit 230 outputs physical addresses stored in a memory cell in response to the activation of the word lines.

In a TLB having a plurality of entries, virtual address comparing circuits compare a virtual address and virtual address tags stored in the virtual address comparing circuits. If each bit of the virtual address is equal to each bit of the virtual address tags, a word line driver corresponding to the virtual address comparing circuits activates word lines.

The TLB 200 shown in FIG. 2 includes 64 entries. When a desired virtual address is input to the TLB 200, 64 virtual address comparing circuits 210 compare the virtual address and virtual address tags (not shown) stored in the virtual address comparing circuits 210 and output the compared result.

If a virtual address tag of the virtual address comparing circuit 0 shown in FIG. 2 coincides with the virtual address, a word line driver 0 is driven, a word line corresponding to the word line driver 0 is activated, and the storing circuit 0 outputs a physical address in response to the activation of the word line. An input virtual address coincides with one of virtual address tags stored in the virtual address comparing circuits, and thus only one of a plurality of word lines of a TLB is driven at any given time.

As described above, the TLB 200 must pass signals through the virtual address comparing circuit 210, the word line drivers 220, and the storing circuit 230 shown in FIG. 2. As described previously, as the size of a program and the size of data increase more and more, an operational speed of a MMU is important and a high-speed TLB is required.

SUMMARY OF THE INVENTION

In an exemplary embodiment, the present invention provides a translation lookaside buffer capable of operating at higher speed.

According to exemplary embodiments, the present invention may provide a translation lookaside buffer capable of operating at higher speed using one or more techniques. These techniques include the use of storing circuits with two more memory cells, either with or without a buffer, the use of two or more groups of virtual address comparing circuits, or one or more word line drivers. These techniques may be used alone or in any combination.

According to an exemplary embodiment, a plurality of storing circuits may include first and second memory cells connected to a word line and output physical addresses stored in the first and second memory cells in response to the activation of the word line. One or more of the plurality of storing circuits may also have a buffer between a node to which the first memory cells and the word line are connected and a node to which the second memory cells and the word line are connected.

According to another exemplary embodiment, the present invention provides a plurality of first virtual address comparing circuits, a plurality of second virtual address comparing circuits, a word line driver, and a plurality of storing circuits. The plurality of first virtual address comparing circuits receive a first group of virtual addresses, compare the first group of virtual addresses with virtual address tags corresponding to the first group of virtual addresses, and output a first control signal in response to the compared results. The plurality of second virtual address comparing circuits receive a second group of virtual addresses, compare the second group of virtual addresses with virtual address tags corresponding to the second group of virtual addresses, and output a second control signal in response to the compared results.

According to another exemplary embodiment, the word line driver receives the first and second control signals to activate a word line corresponding to one of the first and second control signals. The plurality of storing circuits include first and second memory cells connected to the word line and output physical addresses stored in the first and second memory cells in response to the activation of the word line. According to another exemplary embodiment, one or more of the plurality of storing circuits may have a buffer between a node to which the first memory cells and the word line are connected and a node to which the second memory cells and the word line are connected.

In another exemplary embodiment, the first group of virtual addresses correspond to even-numbered bits of the virtual addresses and the second group of virtual addresses correspond to odd-numbered bits of the virtual addresses.

According to another exemplary embodiment, the word line driver may include a latch circuit, a first logic circuit, and a second logic circuit. The latch circuit receives the first and second control signals, performs an AND operation on the first and second control signals to latch the first and second control signals, is synchronized with an external clock signal, and outputs the latched signal. The first logic circuit receives the latched signal output from the latch circuit and the external clock signal, performs an AND operation for the latched signal and the external signal, and outputs a signal. The second logic circuit receives the signal output from the first logic circuit and an enable signal, performs an AND operation on the signal output from the first logic circuit and the enable signal, and outputs a signal.

According to another exemplary embodiment, the word line driver may also include a first AND circuit and a second AND circuit. The first AND circuit receives the first and second control signals, performs an AND operation for the first and second control signals, and outputs a signal in response to the external clock signal. The second AND circuit receives the signal output from the first AND circuit and the enable signal, performs an AND operation for the signal output from the first AND circuit and the enable signal, and outputs a signal.

The various teachings of the exemplary embodiments of the present invention with respect to the virtual address comparing circuits, word line drivers, and storing circuits may be used singly or in combination with each other or with other known circuits (in any combination) to increase the performance of the memory buffer in which they operate.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
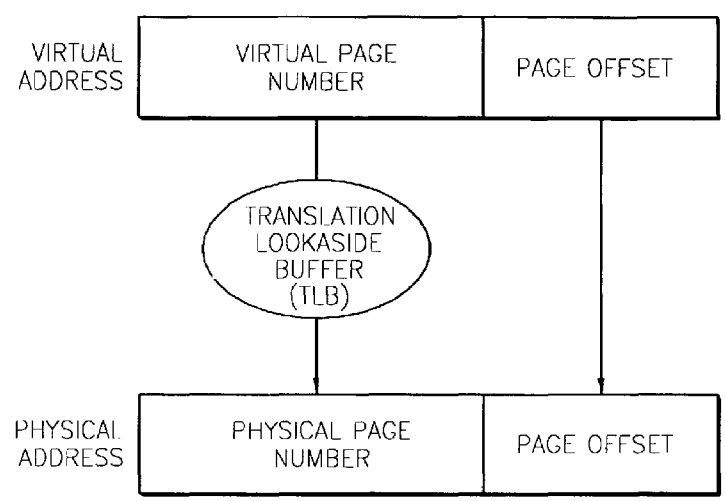
FIG. 1 is a schematic view of a conventional translation lookaside buffer, which translates a virtual address into a physical address.
Figure 2:
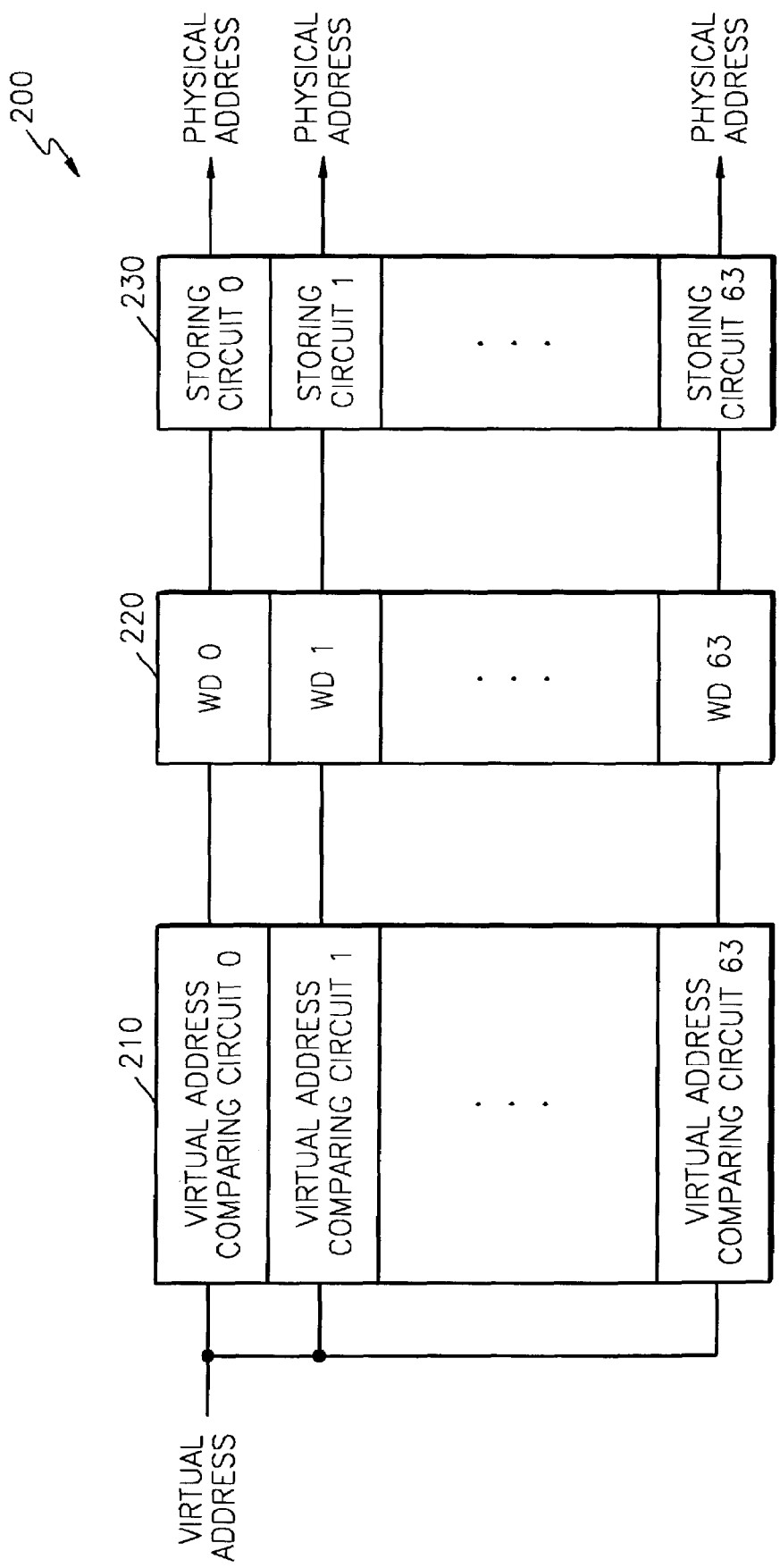
FIG. 2 is a block diagram of a conventional general translation lookaside buffer.

Hereinafter, the present invention will be described in detail by explaining exemplary embodiments of the present invention with reference to the attached drawings. Like reference numerals in the drawings denote the same members.

Figure 3:
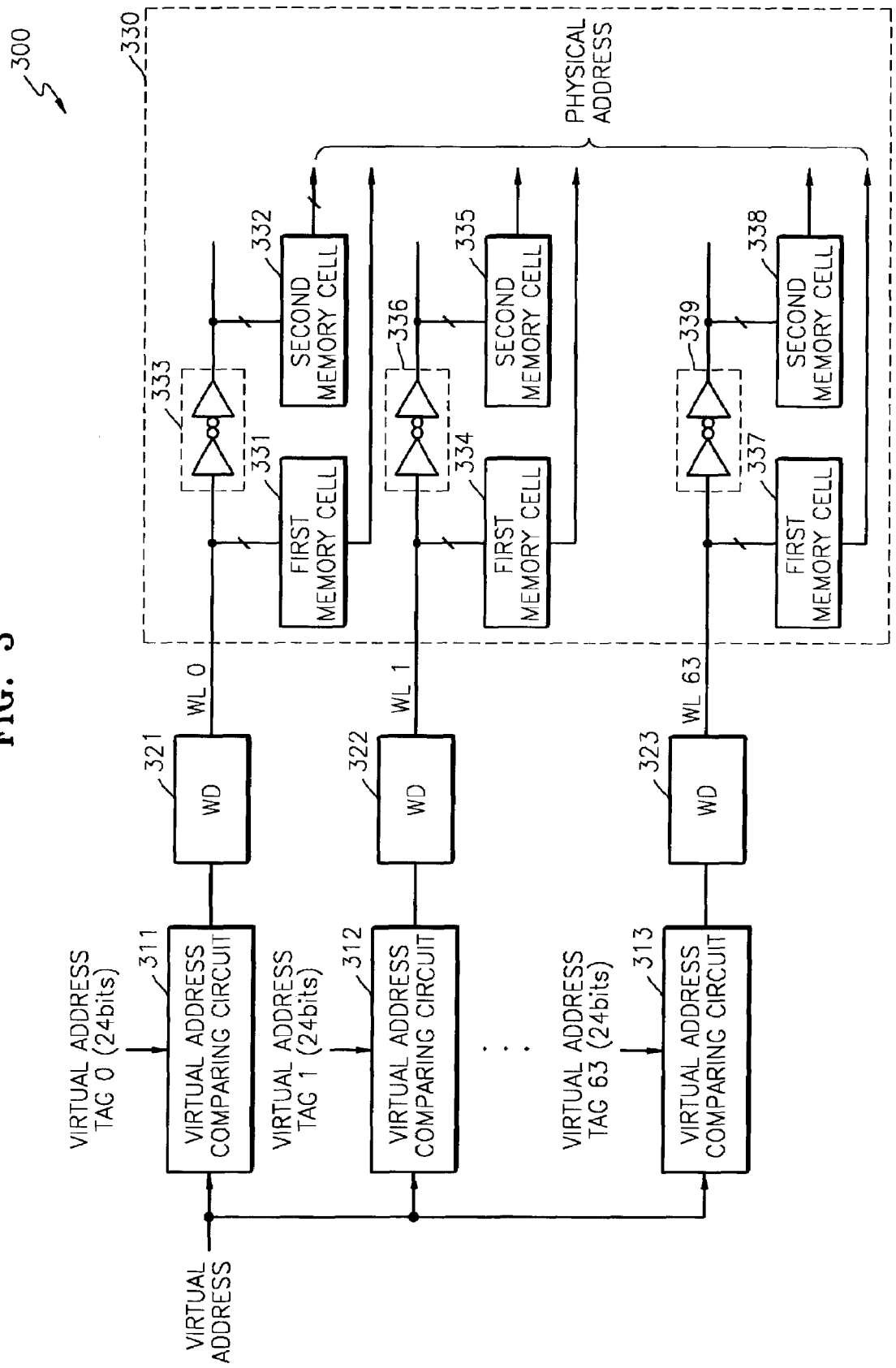
FIG. 3 is a schematic view of a translation lookaside buffer according to an exemplary embodiment of the present invention.

FIG. 3 is a schematic view of a translation lookaside buffer (TLB) according to an exemplary embodiment of the present invention. A TLB 300 includes a plurality of page table entries, which have virtual address comparing circuits 311, 312, and 313, word line drivers 321, 322, and 323, and a storing circuit 330, respectively. The TLB 300 includes 64 entries, although this matter is exemplary, other members being well within the level of one of ordinary skill in the art.

A plurality of virtual address comparing circuits 311, 312, and 313 receive a virtual address, compare the virtual address with one ore more virtual address tags, and output control signals in response to the compared results.

A plurality of word lines 321, 322, and 323 receive the control signals output from the virtual address comparing circuits 311, 312, and 313 to activate word lines.

The virtual address comparing circuits 311, 312, and 313 compare all of bits of the input virtual address with all of bits of the virtual address tags stored in the entries. If the bits of the input virtual address coincide with the bits of the virtual address tag(s), the virtual address comparing circuits 311, 312, and 313 activate word lines of corresponding entries.

The storing circuit 330 includes first memory cells 331, 334, and 337 and second memory cells 332, 335, 338. The first memory cells 331, 334, and 337 and the second memory cells 332, 335, and 338 are connected to word lines WL0, WL1, and WL63 of the entries. The number of the first memory cells 331, 334, and 337 and the second memory cells 332, 335, and 338 is equal to the total number of bits of physical addresses. The storing circuit 330 outputs the physical addresses stored in the first memory cells 331, 334, and 337 and the second memory cells 332, 335, and 338.

The storing circuit 330 includes buffers between nodes to which the first memory cells 331, 334, and 337 and the word lines WL0, WL1, and WL63 are connected and nodes to which the second memory cells 332, 335, and 338 and the word lines WL0, WL1, and WL63 are connected.

Assuming that the TLB 300 includes 64 entries, each of the virtual address tags of the TLB 300 is 24 bits, and each of the physical addresses is 40 bits, the number of memory cells connected to a word line of an entry in the storing circuit 330 is 40. The memory cells can be divided into first memory cells and second memory cells.

In a case where many memory cells are connected to one word line, even though the word line is activated, a load applied to the word line is high. Thus, physical addresses in the memory cells are not rapidly output.

Accordingly, to increase the operational speed of the TLB 300, the TLB 300 includes the first memory cells 331, 334, and 337 and the second memory cells 332, 335, and 338. The TLB 300 also includes buffers 333, 336, and 339 between nodes to which the first memory cells 331, 334, and 337 and the word lines WL0, WL1, and WL63 are connected and nodes to which the second memory cells 332, 335, and 338 and the word lines WL0, WL1, and WL63 are connected. Thus, the first memory cells 331, 334, and 337 are separated from the second memory cells 332, 335, and 338 to improve the first memory cells 331, 334, and 337 and the second memory cells 332, 335, and 338, so that the TLB 300 operates at a high speed.

In an exemplary embodiment, the first memory cells 331, 334, and 337 occupy a small area which operates at a high speed and the second memory cells 332, 335, and 338 occupy a large area which operates at a low speed.

Figure 4:
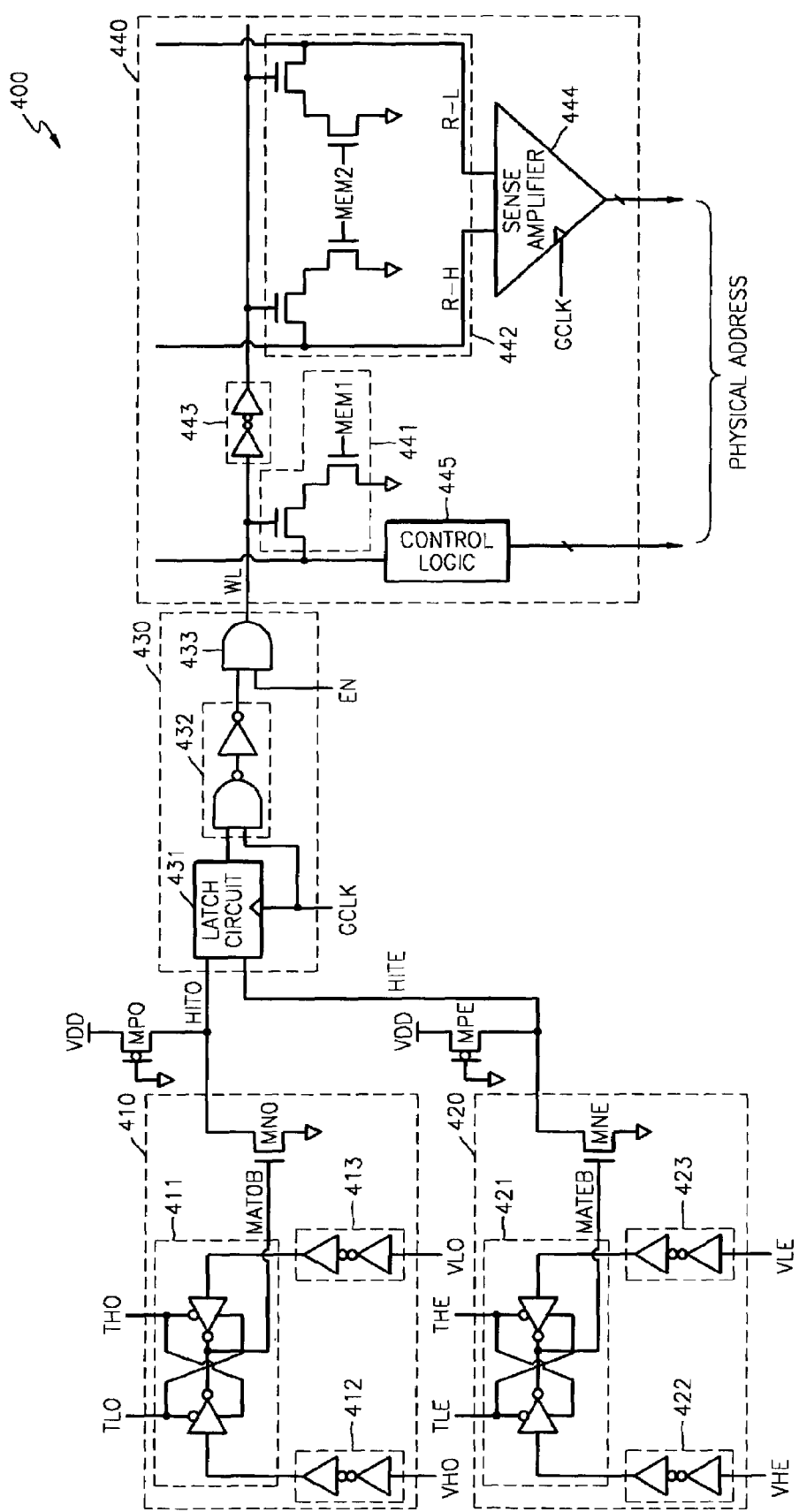
FIG. 4 is a view of a translation lookaside buffer according to another exemplary embodiment of the present invention.

FIG. 4 illustrates a TLB according to another exemplary embodiment of the present invention. Referring to FIG. 4, a TLB 400 includes a first virtual address comparing circuit 410, a second virtual address comparing circuit 420, a word line driver 430, and a storing circuit 440. As shown, FIG. 4 includes one entry. For 64 entries as in FIG. 3, the TLB 400 would include 64 of the structures shown in FIG. 4.

The first virtual address comparing circuit 410 receives a first group of virtual addresses, compares the first group of virtual addresses with one or more virtual address tags corresponding to the first group of virtual addresses, and outputs a first control signal HITO in response to the compared result. In an exemplary embodiment, the first virtual address comparing circuit 410 includes a comparing circuit 411, which receives the first group of virtual addresses, compares the first group of virtual addresses with the virtual address tags corresponding to the first group of virtual addresses, and an MOS transistor MNO having a gate to which an output MATOB of the comparing circuit 411 is connected.

The second virtual address comparing circuit 420 receives a second group of virtual addresses, compares the second group of virtual addresses with one or more virtual address tags corresponding to the second group of virtual addresses, and outputs a second control signal HITE in response to the compared result. In an exemplary embodiment, the second virtual address comparing circuit 420 includes a comparing circuit 421, which receives the second group of virtual addresses and compares the second group of virtual addresses, and a MOS transistor MNE having a gate to which an output MATEB of the comparing circuit 421 is connected.

A driving transistor MPO is a PMOS transistor, which has a gate connected to a ground voltage, a source connected to a power supply voltage VDD, and a drain connected to a node of the first control signal HITO so as to supply power to the NMOS transistor MNO. A driving transistor MPE is a PMOS transistor, which has a gate connected to the ground voltage, a source connected to the power supply voltage VDD, and a drain connected to a node of the second control signal HITE so as to supply power to the NMOS transistor MNE.

In an exemplary embodiment, the first virtual address comparing circuit 410 and the second virtual address comparing circuit 420 receive even-numbered bits of the virtual addresses and odd-numbered bits of the virtual addresses, respectively.

The word line driver 430 receives the first and second control signals HITO and HITE to activate a word line WL. In an exemplary embodiment, the word line driver 430 includes a latch circuit 431, a first logic circuit 432, and a second logic circuit 433. The latch circuit 431 receives the first control signal HITO and the second control signal HITE, performs an AND operation on the first control signal HITO and the second control signal HITE, latches the result of the AND operation, and outputs the latched signal in synchronization with an external clock signal GCLK. The first logic circuit 432 receives the signal output from the latch circuit 431 and the external clock signal GCLK, performs an AND operation on the signal output from the latch circuit 431 and the external clock signal GCLK, and outputs a signal. The second logic circuit 433 receives an enable signal EN and the signal output from the first logic circuit 433, performs an AND operation on the enable signal EN and the signal output from the first logic circuit 432, and outputs a signal.

The storing circuit 440 includes a first memory cell 441, a second memory cell 442, and a buffer 443. The first memory cell 441 and the second memory cell 442 are connected to the word line WL. The buffer 443 is connected between a node to which the first memory cell 441 and the word line WL are connected and a node to which the second memory cell 432 and the word line WL are connected.

Control logic 445 is connected to an output node of the first memory cell 441, receives an output of the first memory cell 441, and outputs data. Data output from the control logic 445 represents whether an access to the system is permitted. A sense amplifier 444 is synchronized with the external clock signal GCLK to sense output signals on nodes R_H and R_L of the second memory cell 442 and to amplify the difference between the output signals on the nodes R_H and R_L.

Only one entry of the TLB 400 is shown in FIG. 4. The TLB 400 includes as many first virtual address comparing circuits 410 as the number of bits of the virtual addresses and as many second virtual address comparing circuits 420 as the number of bits of the virtual addresses. The storing circuit 440 includes as many memory cells as the number of bits of the physical addresses.

A TBL according to exemplary embodiments of the present invention is described with reference to FIG. 4. The first and second virtual address comparing circuits 410 and 420 receive the first and second groups of virtual addresses, respectively, and compare the first and second groups of virtual addresses with one or more virtual address tags corresponding to the first and second groups of virtual addresses.

For example, if virtual addresses VHO and VLO input to the first virtual address comparing circuit 410 are in a first logic state (e.g., logic "high") and virtual address tags THO and TLO corresponding to the virtual addresses VHO and VLO are in the first logic state, the signal MATOB output from the comparing circuit 411 is in a second logic state (e.g., logic "low"). As a result, the MOS transistor MNO is turned off, and thus the first control signal HITO is in the first logic state.

If bits of the virtual addresses VHO and VLO coincide with bits of the virtual address tags THO and TLO, the first control signal HITO is in the first logic state. If one of the bits of the virtual addresses VHO and VLO do not coincide with one of the bits of the virtual address tags THO and TLO, a corresponding one of the MOS transistors MNO and MNE is turned on, and thus the first control signal HITO is in the second logic state.

The latch 431 performs an AND operation on the first and second control signals HITO and HITE. Thus, all of the bits of the virtual addresses VHO and VLO have to coincide with all of the bits of the virtual address tags THO and TLO, so that the first and second logic circuits 432 and 433 activate the word line WL.

When the word line WL is activated, data is output from the first memory cell 431 and the second memory cell 432 connected to the word line WL. This data has physical addresses corresponding to the virtual addresses VHO and VLO.

In exemplary embodiments, in order to increase the speed of a TLB, a TLB includes a buffer between a node to which a first memory cell and a word line are connected and a node to which a second memory cell and the word line are connected. Thus, the load applied to the word line can be reduced, and thus the physical addresses can be more quickly output in response to the activation of the word line.

Also, a virtual address comparing circuit is classified into a first virtual address comparing circuit and a second virtual address comparing circuit. If one virtual address comparing circuit exists, as many MOS transistors as the number of bits are connected to a node from which a control signal is output, which increases the load applied to the node. Thus, the classification of the virtual address comparing circuit can reduce the load applied to the node.

In other words, according to exemplary embodiments of the present invention, the storing circuit includes a buffer. Also, a virtual address comparing circuit is classified into virtual address comparing circuits according to even-numbered bits of virtual addresses and odd-numbered bits of virtual addresses. Thus, the operational speed of a TLB can be increased.

Figure 5:
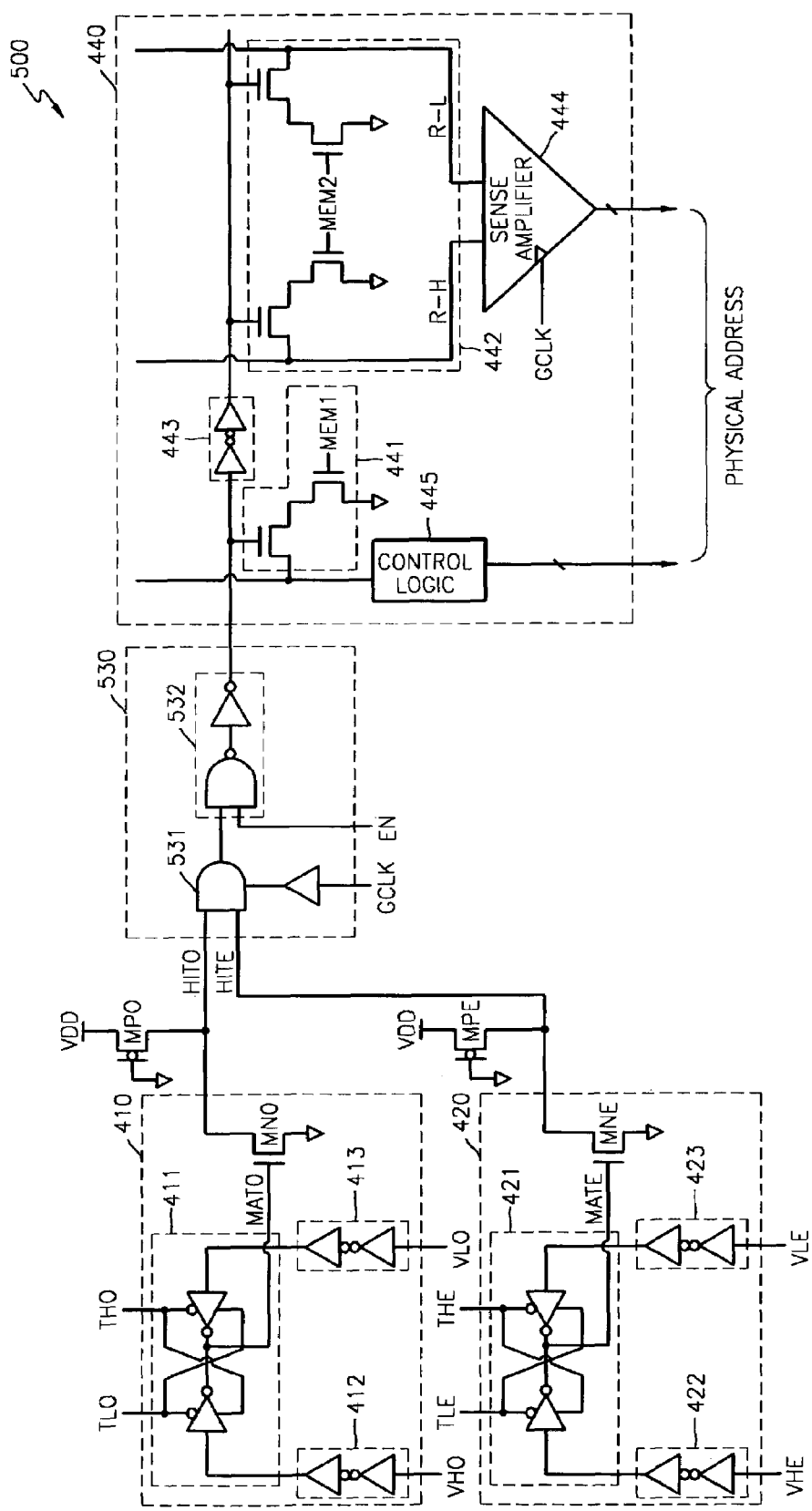
FIG. 5 is a view of a translation lookaside buffer according to another exemplary embodiment of the present invention.

FIG. 5 is a view of a TLB according to another exemplary embodiment of the present invention. Referring to FIG. 5, a TLB 500 includes a first virtual address comparing circuit 410, a second virtual address comparing circuit 420, a word line driver 530, and a storing circuit 440.

The TLB 500 shown in FIG. 5 is different from the TLB 400 shown in FIG. 4 in that the word line driver 530 has a different configuration. The first address comparing circuit 410, the second address comparing circuit 420, and the storing circuit 440 were described with reference to FIG. 4, and thus will not be described here. However, the word line driver 530 will be described.

The word line driver 530 includes a first AND circuit 531 and a second AND circuit 532. The first AND circuit 531 receives first and second control signals HITO and HITE, is synchronized with an external clock signal GCLK, performs an AND operation on the first and second control signals HITO and HITE, and outputs a signal. The second AND circuit 532 receives the signal output from the first AND circuit 531 and an enable signal EN, performs an AND operation for the signal output from the first AND circuit 531 and the enable signal EN, and outputs a signal.

Although exemplary embodiments of the present invention above described dividing virtual address comparing circuit and the stirring circuits into two virtual address comparing circuits and two memory cells, either or both of these elements may be divided into more than two circuits or cells, as would be known to one of ordinary skill in the art. Still further, although the various teachings of the present invention have described in conjunction with a translation lookaside buffer, the teachings of the various exemplary embodiments of the present invention may be applied to other memory buffers or other buffers as well, as would be know to one of ordinary skill in the art.

Since the word line driver 530 of the TLB 500 includes the first AND circuit 531, which receives the first and second control signals HITO and HITE, is synchronized with the external clock signal GLCK, and outputs the signal, the TLB 500 does not use the latch circuit 431 shown in FIG. 4. Thus, the word line driver 530 may reduce the number of gates through which a control signal passes, compared to the word line driver 430 shown in FIG. 4. Therefore, since the TLB 500 uses the first AND circuit 531, the TLB 500 may operate at a higher speed than the speed of the TLB 400 shown in FIG. 4.

As described above, a TLB according to exemplary embodiments of the present invention may include a buffer between first memory cells and second memory cells. Thus, load applied to a word line can be reduced, so that the TLB can operate at a higher speed.

Also, input virtual addresses are divided into a first group of virtual addresses and a second group of virtual addresses and the first and second groups of virtual addresses are compared with virtual address tags corresponding to the first and second groups of virtual addresses to output a signal. As a result, the TLB can operate at a higher speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A translation lookaside buffer comprising:
a plurality of virtual address comparing circuits that receive a virtual address, compare the virtual address with each of a plurality of virtual address tags, and output a control signal in response to the compared result;
a plurality of word line drivers that receive the control signal output from the plurality of virtual address comparing circuits to activate a word line corresponding to the control signal; and
a plurality of storing circuits that include first and second memory cells connected to the word line and output physical addresses stored in the first and second memory cells in response to the activation of the word line,
wherein each of the plurality of storing circuits includes a buffer between a node to which the first memory cells and the word line are connected and a node to which the second memory cells and the word line are connected.

2. A translation lookaside buffer comprising:
a plurality of first virtual address comparing circuits that receive a first group of virtual addresses, compare the first group of virtual addresses with virtual address tags corresponding to the first group of virtual addresses, and output a first control signal in response to the compared results;
a plurality of second virtual address comparing circuits that receive a second group of virtual addresses, compare the second group of virtual addresses with virtual address tags corresponding to the second group of virtual addresses, and output a second control signal in response to the compared results;
a word line driver that receives the first and second control signals to activate a word line corresponding to one of the first and second control signals; and
a plurality of storing circuits that include first and second memory cells connected to the word line and output physical addresses stored in the first and second memory cells in response to the activation of the word line,
wherein each of the plurality of storing circuits includes a buffer between a node to which the first memory cells and the word line are connected and a node to which the second memory cells and the word line are connected.

3. The translation lookaside buffer of claim 2, wherein the first group of virtual addresses correspond to even-numbered bits of the virtual addresses and the second group of virtual addresses correspond to odd-numbered bits of the virtual addresses.

4. The translation lookaside buffer of claim 2, wherein the word line driver comprises:
a latch circuit synchronized with an external clock signal that receives the first and second control signals, performs an AND operation on the first and second control signals to latch the first and second control signals, and outputs the latched signal;
a first logic circuit that receives the latched signal output from the latch circuit and the external clock signal, performs an AND operation on the latched signal and the external signal, and outputs a signal; and
a second logic circuit that receives the signal output from the first logic circuit and an enable signal, performs an AND operation on the signal output from the first logic circuit and the enable signal, and outputs a signal.

5. The translation lookaside buffer of claim 2, wherein the word line driver comprises:

a first AND circuit that receives the first and second control signals, performs an AND operation on the first and second control signals, and outputs a signal in response to the external clock signal; and a second AND circuit that receives the signal output from the first AND circuit and the enable signal, performs an AND operation on the signal output from the first AND circuit and the enable signal, and outputs a signal.

6. A memory buffer comprising:

a plurality of virtual address comparing circuits that receive a virtual address, compare the virtual address with each of a plurality of virtual address tags, and output a control signal in response to the compared result;

a plurality of word line drivers that receive the control signal output from the plurality of virtual address comparing circuits to activate a word line corresponding to the control signal;

a plurality of storing circuits that include first and second memory cells connected to the word line and output physical addresses stored in the first and second memory cells in response to the activation of the word line; and wherein at least one of the plurality of word line drivers includes a first AND circuit that receives the first and second control signals, performs an AND operation on the first and second control signals, and outputs a signal in response to the external clock signal.

7. The memory buffer of claim 6, wherein each of the plurality of storing circuits includes a buffer between a node to which the first memory cells and the word line are connected and a node to which the second memory cells and the word line are connected.

8. The memory buffer of claim 6, wherein the at least one of the plurality of word line drivers further includes a second AND circuit that receives the signal output from the first AND circuit and the enable signal, performs an AND operation on the signal output from the first AND circuit and the enable signal, and outputs a signal.

9. The memory buffer of claim 6, each of said word line drivers including a latch circuit synchronized with an external clock signal that receives the first and second control signals, performs an AND operation on the first and second control signals to latch the first and second control signals, and outputs the latched signal;

a first logic circuit that receives the latched signal output from the latch circuit and the external clock signal, performs an AND operation on the latched signal and the external signal, and outputs a signal; and a second logic circuit that receives the signal output from the first logic circuit and an enable signal, performs an AND operation on the signal output from the first logic circuit and the enable signal, and outputs a signal.

10. The memory buffer of claim 6, wherein said memory buffer is a translation lookaside buffer.

11. The memory buffer of claim 6, said plurality of virtual address comparing circuits including a plurality of first virtual address comparing circuits that receive a first group of virtual addresses, compare the first group of virtual addresses with virtual address tags corresponding to the first group of virtual addresses, and output a first control signal in response to the compared results; and a plurality of second virtual address comparing circuits that receive a second group of virtual addresses, compare the second group of virtual addresses with virtual address tags corresponding to the second group of virtual addresses, and output a second control signal in response to the compared results.

12. The memory buffer of claim 11, each of said word line drivers including a first AND circuit that receives the first and second control signals, performs an AND operation on the first and second control signals, and outputs a signal in response to the external clock signal; and a second AND circuit that receives the signal output from the first AND circuit and the enable signal, performs an AND operation on the signal output from the first AND circuit and the enable signal, and outputs a signal.

13. The memory buffer of claim 11, each of said word line drivers including a latch circuit synchronized with an external clock signal that receives the first and second control signals, performs an AND operation on the first and second control signals to latch the first and second control signals, and outputs the latched signal;

a first logic circuit that receives the latched signal output from the latch circuit and the external clock signal, performs an AND operation on the latched signal and the external signal, and outputs a signal; and a second logic circuit that receives the signal output from the first logic circuit and an enable signal, performs an AND operation on the signal output from the first logic circuit and the enable signal, and outputs a signal.

14. A memory buffer comprising:

a plurality of first virtual address comparing circuits that receive a first group of virtual addresses, compare the first group of virtual addresses with virtual address tags corresponding to the first group of virtual addresses, and output a first control signal in response to the compared results;

a plurality of second virtual address comparing circuits that receive a second group of virtual addresses, compare the second group of virtual addresses with virtual address tags corresponding to the second group of virtual addresses, and output a second control signal in response to the compared results;

a word line driver that receives the first and second control signals to activate a word line corresponding to one of the first and second control; and wherein at least one of the plurality of word line drivers includes a first AND circuit that receives the first and second control signals, performs an AND operation on the first and second control signals, and outputs a signal in response to the external clock signal.

15. The memory buffer of claim 14, wherein the first group of virtual addresses correspond to even-numbered bits of the virtual addresses and the second group of virtual addresses correspond to odd-numbered bits of the virtual addresses.

16. The memory buffer of claim 14, wherein said memory buffer is a translation lookaside buffer.

17. The memory buffer of claim 14, wherein the at least one of the plurality of word line drivers further includes a second AND circuit that receives the signal output from the first AND circuit and the enable signal, performs an AND operation on the signal output from the first AND circuit and the enable signal, and outputs a signal.

18. The memory buffer of claim 14, each of said word line drivers including a latch circuit synchronized with an external clock signal that receives the first and second control signals, performs an AND operation on the first and second control signals to latch the first and second control signals, and outputs the latched signal;

a first logic circuit that receives the latched signal output from the latch circuit and the external clock signal, performs an AND operation on the latched signal and the external signal, and outputs a signal; and a second logic circuit that receives the signal output from the first logic circuit and an enable signal, performs an AND operation on the signal output from the first logic circuit and the enable signal, and outputs a signal.

19. A memory buffer comprising:

a word line driver that receives first and second control signals to activate a word line corresponding to one of the first and second control signals, said a word line driver including a latch circuit synchronized with an external clock signal that receives the first and second control signals, performs an AND operation on the first and second control signals to latch the first and second control signals, and outputs the latched signal;

a first logic circuit that receives the latched signal output from the latch circuit and the external clock signal, performs an AND operation on the latched signal and the external signal, and outputs a signal; and a second logic circuit that receives the signal output from the first logic circuit and an enable signal, performs an AND operation on the signal output from the first logic circuit and the enable signal, and outputs a signal.

20. The memory buffer of claim 19, wherein said memory buffer is a translation lookaside buffer.

21. A memory buffer comprising:

a word line driver that receives first and second control signals to activate a word line corresponding to one of the first and second control signals, said a word line driver including a first AND circuit that receives the first and second control signals, performs an AND operation on the first and second control signals, and outputs a signal in response to the external clock signal; and a second AND circuit that receives the signal output from the first AND circuit and the enable signal, performs an AND operation on the signal output from the first AND circuit and the enable signal, and outputs a signal.

22. The memory buffer of claim 21, wherein said memory buffer is a translation lookaside buffer.

* * * * *